(12) United States Patent
Arai

(10) Patent No.: US 12,619,706 B2
(45) Date of Patent: May 5, 2026

(54) SERVER, NON-TRANSITORY COMPUTER-READABLE RECORDING MEDIUM STORING COMPUTER-READABLE INSTRUCTIONS FOR SERVER AND CONTROL METHOD FOR SERVER

(71) Applicant: BROTHER KOGYO KABUSHIKI KAISHA, Nagoya (JP)

(72) Inventor: Kentaro Arai, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 106 days.

(21) Appl. No.: 18/403,303

(22) Filed: Jan. 3, 2024

(65) Prior Publication Data

US 2024/0232325 A1 Jul. 11, 2024

(30) Foreign Application Priority Data

Jan. 6, 2023 (JP) ................................. 2023-001226

(51) Int. Cl.
*G06F 21/45* (2013.01)
*G06F 3/12* (2006.01)
*G06F 21/60* (2013.01)

(52) U.S. Cl.
CPC .................................. *G06F 21/45* (2013.01)

(58) Field of Classification Search
CPC ...... G06F 3/1238; G06F 3/1222; G06F 21/31; G06F 21/45; G06F 21/608; H04L 63/083; H04L 63/0876; H04L 63/08; H04W 12/06

USPC .................................... 726/4, 6, 28; 709/217
See application file for complete search history.

(56) References Cited

U.S. PATENT DOCUMENTS

| | | | | |
|---|---|---|---|---|
| 9,405,492 B2 * | 8/2016 | Yamada | ................. | G06F 3/1289 |
| 9,705,860 B2 * | 7/2017 | Doui | ................... | H04L 41/0233 |
| 10,908,891 B2 * | 2/2021 | Nakaguma | .............. | B60R 16/02 |
| 12,141,265 B2 * | 11/2024 | Hua | ........................ | H04L 63/083 |
| 2002/0062453 A1 * | 5/2002 | Koga | .................... | G06F 21/608 |
| | | | | 726/32 |
| 2014/0280724 A1 * | 9/2014 | Kamma | .................. | H04L 67/10 |
| | | | | 709/217 |
| 2015/0143475 A1 * | 5/2015 | Song | ....................... | H04L 63/08 |
| | | | | 726/4 |

(Continued)

FOREIGN PATENT DOCUMENTS

JP          2019-016834 A          1/2019

*Primary Examiner* — Lizbeth Torres-Diaz
(74) *Attorney, Agent, or Firm* — Kenealy Vaidya LLP

(57) ABSTRACT

A server may comprise a memory configured to store account information and identification information identifying a device, the account information and the identification information being in association with each other; and a controller, wherein the controller is configured to: in a case where a changing operation is performed on the device, receive a predetermined signal from the device, the changing operation being for changing a password currently set for the device; and in a case where a specific condition is fulfilled, send the device a permission signal for permitting a change of the password, wherein the specific condition is that the predetermined signal is received from the device and a terminal device different from the device is logged in to the server by using the account information stored in association with the identification information identifying the device.

15 Claims, 8 Drawing Sheets

(Registraition of Printer)

(56)         References Cited

U.S. PATENT DOCUMENTS

| | | | | |
|---|---|---|---|---|
| 2016/0112419 A1* | 4/2016 | Cai | H04L 63/0884 | |
| | | | | 726/6 |
| 2016/0286390 A1* | 9/2016 | Benoit | H04W 12/06 | |
| 2016/0344730 A1* | 11/2016 | Holz | H04L 63/0428 | |
| 2019/0004752 A1* | 1/2019 | Yamada | G06F 3/1267 | |
| 2023/0008132 A1* | 1/2023 | Arai | H04L 63/083 | |
| 2023/0315873 A1* | 10/2023 | Ohkubo | G06F 21/31 | |
| | | | | 726/28 |
| 2024/0257155 A1* | 8/2024 | Omegna | G06F 21/604 | |

* cited by examiner

FIG. 2

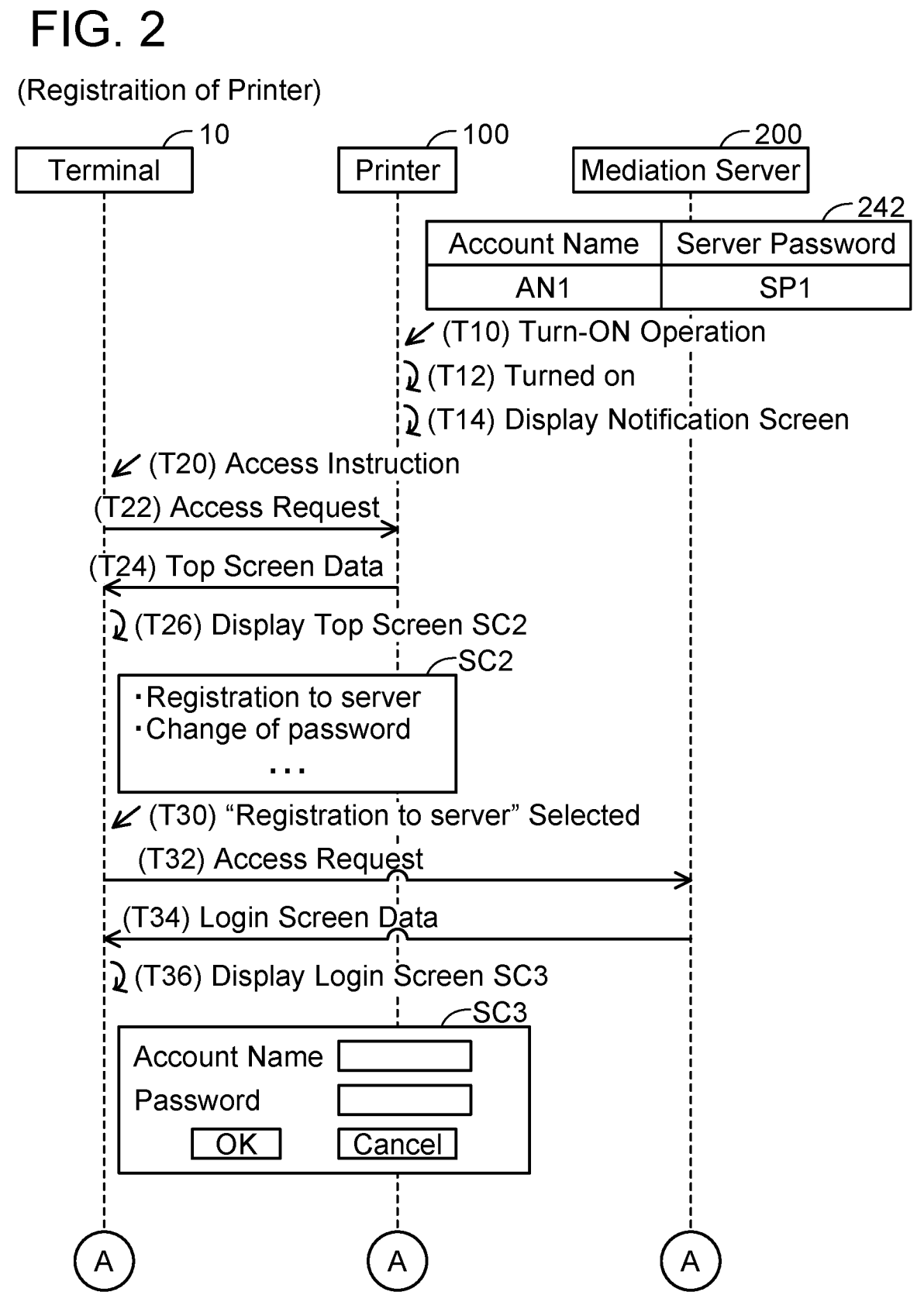

(Registraition of Printer)

| Account Name | Server Password |
|---|---|
| AN1 | SP1 |

~242

(T10) Turn-ON Operation (T12) Turned on (T14) Display Notification Screen (T20) Access Instruction (T22) Access Request (T24) Top Screen Data (T26) Display Top Screen SC2

~SC2

- Registration to server
- Change of password
  ...

(T30) "Registration to server" Selected (T32) Access Request (T34) Login Screen Data (T36) Display Login Screen SC3

~SC3

Account Name [ ]
Password [ ]
[ OK ] [ Cancel ]

(First to Third Embodiments: Reset of Password)     FIG. 4

(Fourth Embodiment: Reset of Password)

(Fifth Embodiment: Reset of Password)

(Sixth Embodiment: Reset of Password)

(Seventh Embodiment: Reset of Password)

SERVER, NON-TRANSITORY COMPUTER-READABLE RECORDING MEDIUM STORING COMPUTER-READABLE INSTRUCTIONS FOR SERVER AND CONTROL METHOD FOR SERVER

REFERENCE TO RELATED APPLICATION

This application claims priority to Japanese Patent Application No. 2023-001226 filed on Jan. 6, 2023. The entire content of the priority application is incorporated herein by reference.

BACKGROUND ART

A technology for changing a passcode to use a multifunction peripheral (MFP) is known. In this technology, the MFP executes a process for changing a passcode when accepting input of a wrong passcode from a user.

DESCRIPTION

The disclosure herein provides a technology that allows a password of a device to be securely changed.

A server disclosed herein may comprise a memory configured to store account information and identification information identifying a device, the account information and the identification information being in association with each other; and a controller. The controller may be configured to: in a case where a changing operation is performed on the device, receive a predetermined signal from the device, the changing operation being for changing a password currently set for the device; and in a case where a specific condition is fulfilled, send the device a permission signal for permitting a change of the password, wherein the specific condition is that the predetermined signal is received from the device and a terminal device different from the device is logged in the server by using the account information stored in association with the identification information identifying the device.

According to the configuration above, the permission signal is not sent from the server to the device even when a third party performed the changing operation on the device unless a user who knows the account information makes the terminal device log in to the server. The password of the device can thus be changed securely.

Computer-readable instructions for realizing the above server and a non-transitory computer-readable recording medium storing the computer-readable instructions are also novel and useful. Further, a control method for the above server is also novel and useful. Further, a communication system comprising the above server, the above device, and the above terminal device is also novel and useful.

FIG. 2 is a sequence diagram of a printer registration process.

FIRST EMBODIMENT

Figure 1:
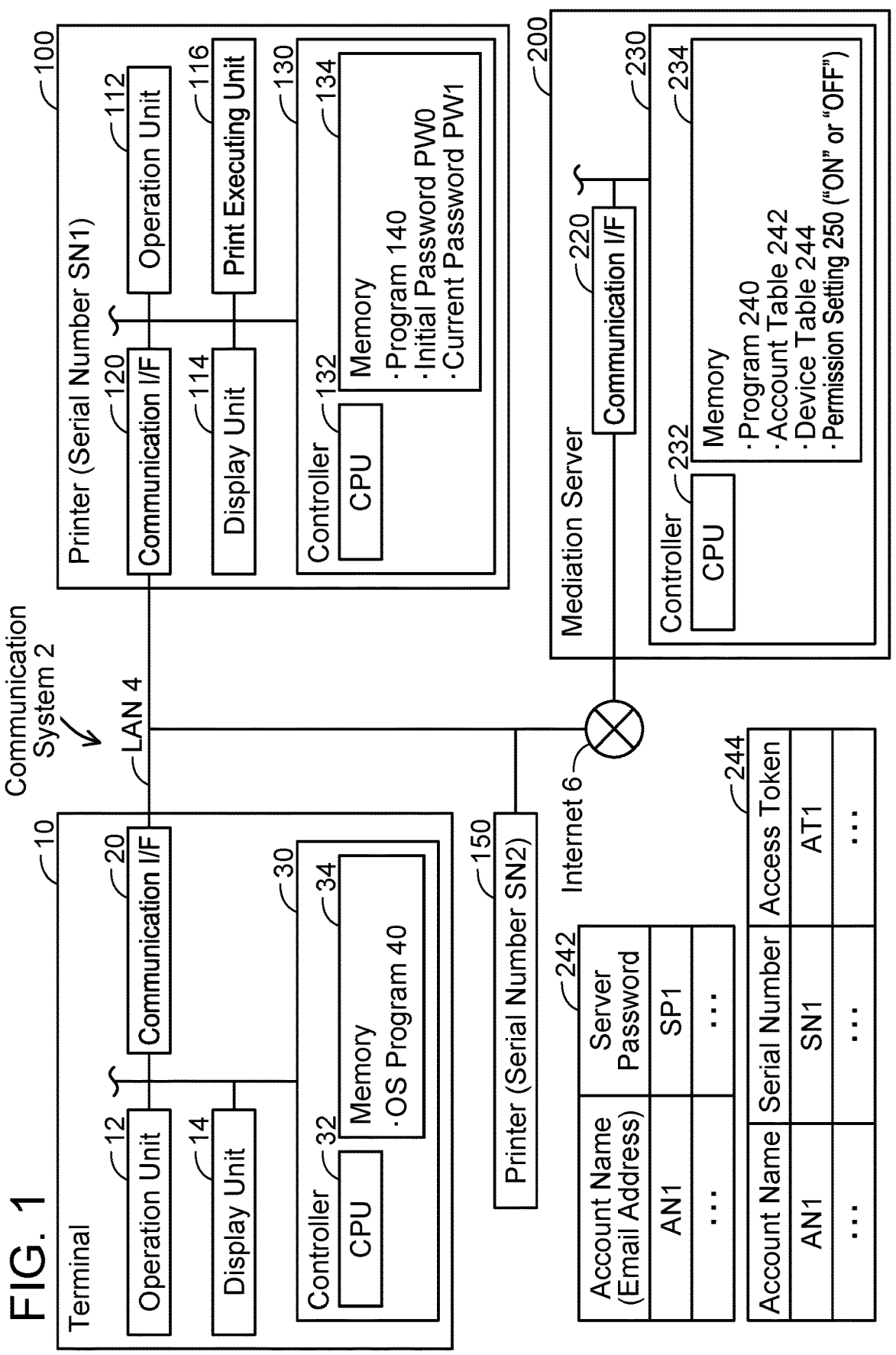
FIG. 1 is a block diagram of a communication system.

Configuration of Communication System 2; FIG. 1

As shown in FIG. 1, a communication system 2 comprises a terminal 10, a printer 100, a printer 150, and a mediation server 200. The terminal 10, the printer 100, and the printer 150 are connected to a local area network (LAN) 4 and can communicate with each other via the LAN 4. The LAN 4 is connected to the internet 6, and the mediation server 200 is set up on the internet 6. Thus, the terminal 10, the printer 100, and the printer 150 can communicate with the mediation server 200 via the internet 6. Hereinafter, the mediation server 200 will be referred to as "server 200". The number of printers connected to the LAN 4 is not limited to two, but may be one or three or more.

Passwords are set for the printers 100 and 150. An administrator inputs the password of the printer 100 to the printer 100 in order to change settings (e.g., network configuration) of the printer 100. The printer 100 permits the settings to be changed if authentication for the password inputted by the administrator succeeds. The disclosure herein provides a technology that allows the password set for the printer 100 or 150 to be changed when the administrator does not remember the password.

Configuration of Terminal 10

The terminal 10 may be a portable terminal device such as a smartphone, a notebook PC, a tablet PC, or the like, or may be a stationary terminal device such as a desktop PC or the like. The terminal 10 is used by the administrator who manages the printers 100 and 150. The terminal 10 comprises an operation unit 12, a display unit 14, a communication interface 20, and a controller 30. Hereinafter, interface will be abbreviated as "I/F".

The operation unit 12 is a plurality of buttons, a touch screen, or the like configured to be operated by the user. The user can input various instructions to the terminal 10 by operating the operation unit 12. The display unit 14 is a display configured to display various information. The communication I/F 20 is connected to the LAN 4.

The controller 30 comprises a CPU 32 and a memory 34. The CPU 32 executes various processes according to an operating system (OS) program 40 stored in the memory 34. The memory 34 is configured of a volatile memory, a non-volatile memory, etc. The OS program 40 is a program for implementing basic operations of the terminal 10.

Configurations of Printers 100 and 150

The printer 100 is a peripheral device (e.g., a peripheral device of the terminal 10) configured to execute a print function. In a modification, the printer 100 may be a multifunctional device configured to execute a scan function, a FAX function, etc. in addition to the print function. The printer 100 has a serial number SN1 for identifying the printer 100. The printer 100 comprises an operation unit 112, a display unit 114, a print executing unit 116, a communication I/F 120, and a controller 130.

The operation unit 112 is a plurality of buttons, a touch screen, or the like configured to be operated by the user. The user can input various instructions to the printer 100 by operating the operation unit 112. The display unit 114 is a display configured to display various information. The print executing unit 116 comprises a print mechanism of inkjet scheme, laser scheme, etc. The communication I/F 120 is connected to the LAN 4.

The controller 130 comprises a CPU 132 and a memory 134. The memory 134 is configured of a volatile memory, a non-volatile memory, etc. The CPU 132 executes various processes according to a program 140 stored in the memory 134.

The memory 134 further stores an initial password PW0 and a current password PW1. The initial password PW0 is a password set for the printer 100 in the shipping stage of the printer 100. The initial password PW0 is, for example, written in/on a medium (e.g., manual) enclosed in the package of the printer 100. The current password PW1 is a password currently set for the printer 100. For example, in the shipping stage of the printer 100, the current password PW1 is the same as the initial password PW0. For example, if the initial password PW0 is changed to a new password by the administrator, the current password PW1 is different from the initial password PW0.

The printer 150 has the same configuration as that of the printer 100. The printer 150 has a serial number SN2 for identifying the printer 150.

Configuration of Server 200

The server 200 is a mediation server configured to mediate various communication for changing the password of the printer 100. The server 200 comprises a communication I/F 220 and a controller 230. The communication I/F 220 is connected to the internet 6.

The controller 230 comprises a CPU 232 and a memory 234. The CPU 232 executes various processes according to a program 240 stored in the memory 234. The memory 234 is configured of a volatile memory, a non-volatile memory, etc. The memory 234 further stores an account table 242, a device table 244, and a permission setting 250.

The account table 242 stores one or more pieces of account information corresponding to one or more users. Each account information is information required to log in to the server 200 and includes an account name and a password associated with each other. Hereinafter, a password used to log in to the server 200 will be referred to as "server password". In the example shown in FIG. 1, an account name AN1 and a server password SP1 are stored in association with each other in the account table 242. In the present embodiment, e-mail addresses are used as account names. In a modification, account names may be character strings designated by the user instead of e-mail addresses.

The device table 244 stores one or more pieces of information related to one or more devices (e.g., printers). In the device table 244, each account name is stored in association with a serial number and an access token. Each access token is information used when the server 200 communicates with the device identified by the associated serial number. In the example shown in FIG. 1, the account name AN1, the serial number SN1, and an access token AT1 are stored in association with each other in the device table 244.

Figure 4:
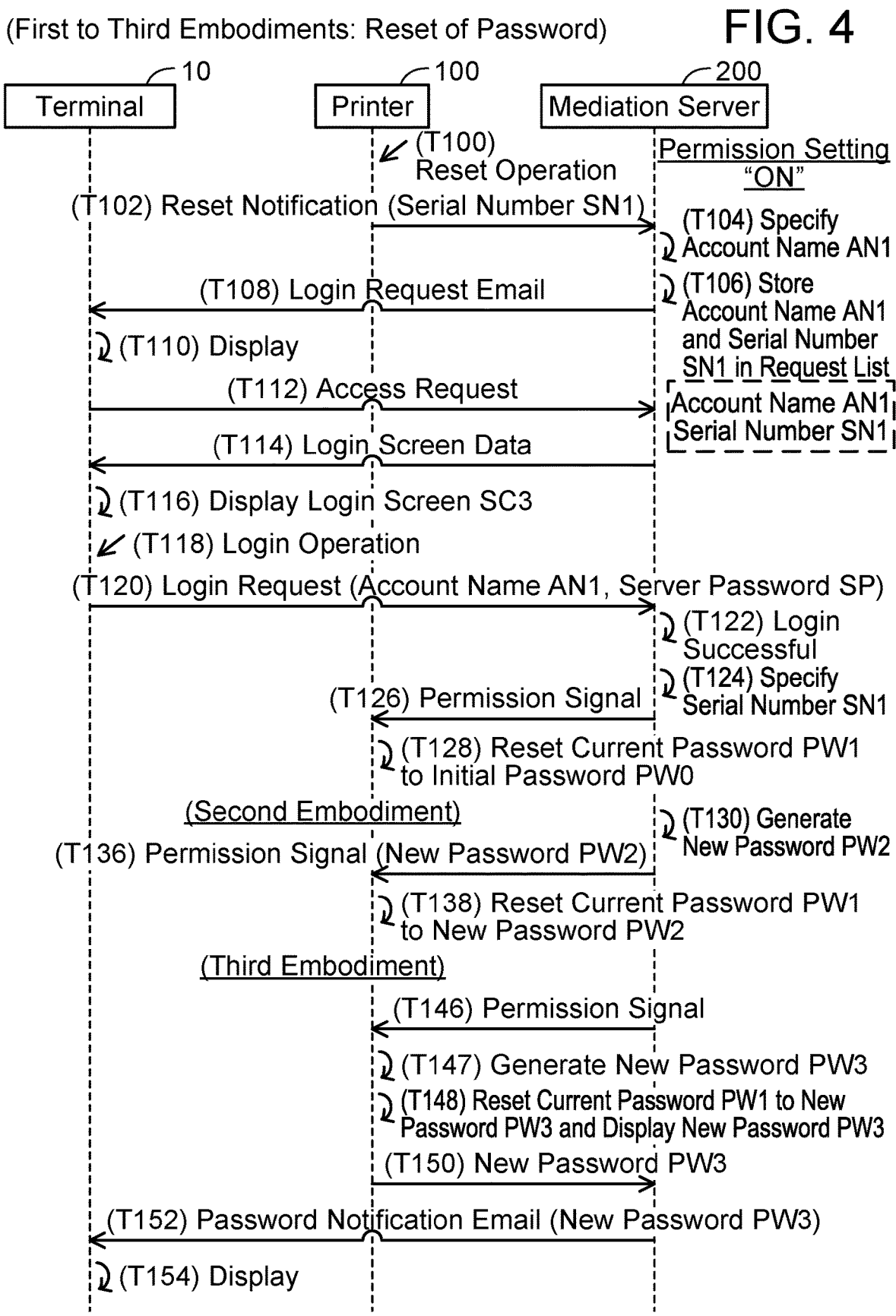
FIG. 4 is a sequence diagram of password reset process.

The permission setting 250 indicates one of "ON", meaning that a password reset through a process shown in FIG. 4 (which will be described later) is permitted and "OFF", meaning that the password reset through the process shown in FIG. 4 is not permitted. The permission setting 250 is set by the administrator. The administrator can set whether or not to permit the password reset through the process shown in FIG. 4.

Figure 3:
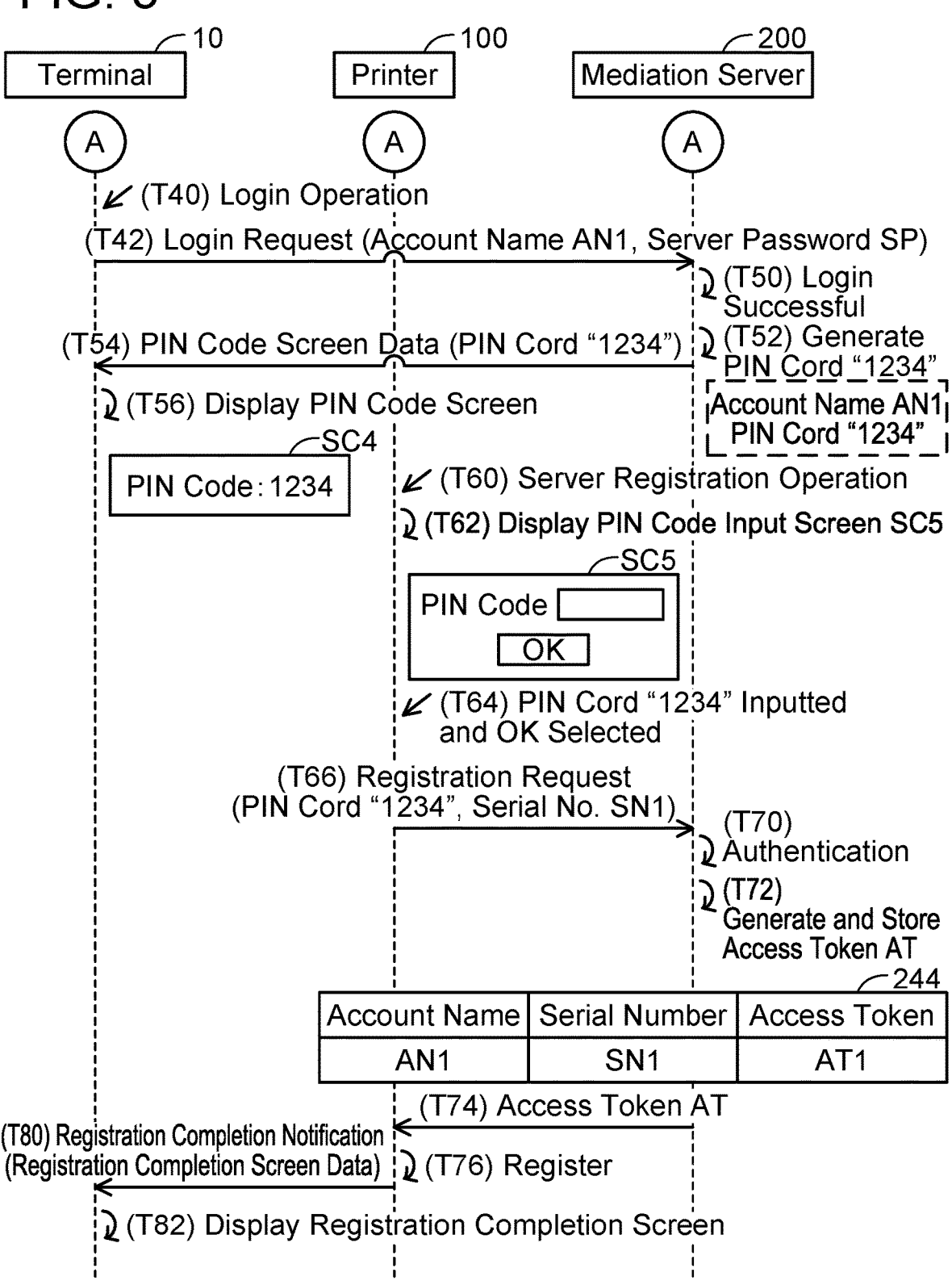
FIG. 3 is a sequence diagram continued from FIG. 2.

Registration of Printer 100; FIGS. 2 and 3

Referring to FIGS. 2 and 3, a process for registering information related to the printer 100 in the server 200 is described. Hereinafter, in order to facilitate the understanding, processes executed by the CPUs of the respective devices (e.g., 32, 132, 232) will be described with the devices (e.g., the terminal 10, the printer 100, the server 200) as subjects of actions, not with the CPUs as the subjects of actions. Further, the devices communicate with each other via their communication I/Fs (e.g., 20, 120, 220) unless otherwise stated, and thus in the following description regarding communication between the devices, a phrase "via the communication I/F" will be omitted.

In the initial state in FIG. 2, the combination of the account name AN1 and the server password SP1, which is account information of the user of the terminal 10, i.e., the administrator of the printer 100, is stored in the account table 242. Further, in the initial state in FIG. 2, information related to the printer 100 (i.e., the serial number SN1 and the access token AT1) is not stored yet in the device table 244.

In response to accepting a turn-on operation from the administrator in T10, the printer 100 is turned on in T12. At this time, the printer 100 determines that the information related to the printer 100 itself is not registered yet in the server 200. Specifically, the printer 100 determines that the information is not registered yet in the server 200 because an access token is not stored in the memory 134. In this case, the printer 100 displays a notification screen on the display unit 114 in T14. The notification screen includes a message that prompts the user to register the information related to the printer 100 in the server 200.

When seeing the notification screen, the administrator performs on the terminal 10 an operation for registering the information related to the printer 100 in the server 200. Specifically, the terminal 10 first accepts an access instruction to access a webserver function of the printer 100 from the administrator in T20. This access instruction includes designation of an IP address (not shown) of the printer 100. In this case, the terminal 10 sends an access request to the printer 100 in T22 using a web browser program, which is not shown. In the following description, processes executed by the terminal 10 are also executed using the web browser program unless otherwise stated.

In response to receiving the access request from the terminal 10 in T22, the printer 100 sends top screen data corresponding to a top screen SC2 to the terminal 10 in T24.

In response to receiving the top screen data from the printer 100 in T24, the terminal 10 displays the top screen SC2 on the display unit 14 in T26. The top screen SC2 includes a plurality of buttons for changing the settings of the printer 100 (e.g., "Registration to server" button, "Password change" button, etc.).

The terminal 10 accepts selection of the "Register to server" button in the top screen SC2 in T30. In this case, the terminal 10 sends an access request to the server 200 in T32.

In response to receiving the access request from the terminal 10 in T32, the server 200 sends login screen data corresponding to a login screen SC3 to the terminal 10 in T34.

In response to receiving the login screen data from the server 200 in T34, the terminal 10 displays the login screen SC3 on the display unit 14 in T36. The login screen SC3 includes input fields for input of account information (i.e., an account name and a server password) to log in to the server 200, an OK button, and a cancel button.

Then, in T40 of FIG. 3, the terminal 10 accepts a login operation from the administrator. The login operation includes an operation of inputting the account name AN1 and the server password SP1 in the login screen SC3. In this case, the terminal 10 sends a login request including the inputted account name AN1 and server password SP1 to the server 200 in T42.

In response to receiving the login request from the terminal 10 in T42, the server 200 executes login authentication in T50. Specifically, the server 200 determines whether the combination of the account name AN1 and the server password SP1 included in the received login request is in the account table 242. In the present case, this combination is in the account table 242 (as in the initial state of FIG. 2), and thus the server 200 determines that the login authentication succeeds. In this case, the server 200 generates a PIN code "1234" in T52 and stores the PIN code "1234" in the memory 234 in association with the account name AN1 included in the received login request. The server 200 then sends PIN code screen data corresponding to a PIN code screen SC4 to the terminal 10 in T54. If the server 200 determines that the combination of the account name and the server password included in the received login request is not in the account table 242 in T50, i.e., if the login authentication fails, a sequence from T52 onward is not executed.

In response to receiving the PIN code screen data from the server 200 in T54, the terminal 10 displays the PIN code screen SC4 on the display unit 14 in T56. The PIN code screen SC4 includes a character string indicating the PIN code "1234". When seeing the PIN code screen SC4, the administrator performs a server registration operation of inputting the PIN code "1234" to the printer 100.

In response to accepting the server registration operation from the administrator in T60, the printer 100 displays a PIN code input screen SC5 on the display unit 114 in T62. The PIN code input screen SC5 includes an input field for input of a PIN code and an OK button.

In response to accepting input of the PIN code "1234" in the PIN code input screen SC5 and selection of the OK button in T64, the printer 100 sends a registration request to the server 200 in T66. The registration request includes the inputted PIN code "1234" and the serial number SN1 of the printer 100.

In response to receiving the registration request from the printer 100 in T66, the server 200 executes PIN authentication in T70. Specifically, the server 200 determines whether the PIN code "1234" included in the received registration request is in the memory 234. In the present case, the server 200 determines that the authentication succeeds since the PIN code "1234" is in the memory 234 (see T52). In this case, the server 200 generates an access token AT1 in T72. Then, the server 200 specifies the account name AN1 associated with the PIN code "1234" in the memory 234 (see T52). The server 200 then stores the specified account name AN1, the serial number SN1 included in the registration request, and the generated access token AT1 in association with each other in the device table 244. In this way, the information related to the printer 100 is registered in the server 200.

The server 200 sends the access token AT1 to the printer 100 in T74. If the PIN code included in the registration request is not in the memory 234 in T70, i.e., if the authentication fails, a sequence from T72 onward is not executed.

In response to receiving the access token AT1 from the server 200 in T74, the printer 100 registers the access token AT1 in the memory 134 in T76. As a result, a so-called always-on connection is established between the printer 100 and the server 200, although this is not shown in the drawings. By using the always-on connection, the server 200 can send signals to the printer 100 beyond the firewall of the LAN 4 to which the printer 100 belong, without receiving requests from the printer 100. That is, the always-on connection allows server-push communication. The always-on connection is a connection according to, for example, Extensible Messaging and Presence Protocol (XMPP).

Once completing the registration of the access token AT1, the printer 100 sends the terminal 10 in T80 a registration completion notification indicating that the registration in the server 200 has completed. The registration completion notification includes registration completion screen data corresponding to a registration completion screen.

In response to receiving the registration completion notification from the printer 100 in T80, the terminal 10 displays the registration completion screen on the display unit 14 in T82. The registration completion screen includes a message indicating that the registration in the server 200 has completed. By seeing the registration completion screen, the administrator is able to know that the registration in the server 200 has completed.

Password Reset; FIG. 4

Referring to FIG. 4, a process for the administrator to reset the password of the printer 100 is described. In the initial state of FIG. 4, the permission setting 250 indicates "ON".

In response to a reset operation for a password reset being performed on the printer 100 in T100, the printer 100 sends the server 200 a reset notification notifying that the reset operation has been performed in T102. The reset notification includes the serial number SN1 of the printer 100.

In response to receiving the reset notification from the printer 100 in T102, the server 200 specifies the account name AN1 associated with the serial number SN1, which is included in the reset notification, in the account table 242 in T104.

In T106, the server 200 stores the account name AN1 specified in T104 and the serial number SN1 included in the reset notification of T102 in a request list in the memory 234. Here, the request list is a list of printers for which the reset operation has been performed to change their passwords.

In T108, the server 200 sends a login request e-mail that requests login to the server 200. The login request e-mail includes the account name AN1 as its recipient's e-mail address. Further, the login request e-mail includes a message that prompts the login to the server 200 in the body.

In the present case, the e-mail address which is the account name AN1 is set for the mailer of the terminal 10. The terminal 10 receives the login request e-mail from the server 200 in T108 and displays the login request e-mail on the display unit 14 in T110. For example, the user reads the message in the login request e-mail and then starts the web browser program in the terminal 10. In response to this, a sequence from T112 onward is executed to reset the password of the printer 100. The password reset can thus be executed smoothly.

T112 to T122 are the same as T32 to T36 in FIGS. 2 and T40 to T50 in FIG. 4. That is, the terminal 10 logs in to the server 200 using the account name AN1 and the server password SP1.

In response to determining that the login by the terminal 10 succeeds in T122, the server 200 specifies, in T124, the serial number SN1 associated with the account name AN1, which is included in the login request received in T120, in the request list stored in T106.

In T126, the server 200 sends the printer 100 a permission signal as a response to the reset notification of T102. The permission signal is a signal for permitting the password of the printer 100 to be reset.

In response to receiving the permission signal from the server 200 in T126, the printer 100 resets its password by changing the current password PW1 to the initial password PW0 in T128. In a modification, the printer 100 may display a password input screen on the display unit 114 and reset its password by changing the current password PW1 to a password inputted by the administrator to the password input screen.

For example, if the login using the account name AN1 is not executed within a predetermined time period after the login request e-mail was sent in T108, the serial number SN1 is deleted from the request list. The deletion of the serial number SN1 from the request list results in a failure in the specifying of T124. As a result, the permission signal is not sent to the printer 100. If the predetermined time period has elapsed since the login request e-mail was sent or if the login fails in T122, the permission signal is not sent to the printer 100 and thus the password of the printer 100 is not reset.

Effects of Present Embodiment

According to the configuration of the present embodiment, the server 200 sends the permission signal to the printer 100 if a condition that: the server 200 receives the reset notification which is sent from the printer 100 in response to the reset operation being performed on the printer 100; and the login using the account name AN1 succeeds (T102 and T122), is fulfilled. On the other hand, the server 200 does not send the permission signal to the printer 100 if the condition is not fulfilled. In this case, the password of the printer 100 is not reset. For example, even when a third party performs the reset operation on the printer 100, the permission signal is not sent from the server 200 to the printer 100 unless the administrator who knows the account name AN1 and the server password SP1 makes the terminal 10 log in to the server 200. Thus, the password of the printer 100 can be changed securely.
Correspondence Relationships The server 200, the memory 234, and the permission setting 250 are examples of "server", "memory", and "setting value", respectively. The terminal 10 is an example of "terminal device" and "external device". The printer 100 and the serial number SN1 are examples of "device" and "identification information", respectively. The account name AN1 and the server password SP1 are an example of "account information". The current password PW1 is an example of "password". The PIN code "1234" is an example of "specific information". The reset operation in T100 and the reset notification in T102 of FIG. 4 are examples of "changing operation" and "predetermined signal", respectively. The permission signal in T126 is an example of "permission signal". The login request e-mail in T108 is an example of "message".

T102 and T126 in FIG. 4 are examples of "receive a predetermined signal from the device" and "send the device a permission signal", respectively.

Second Embodiment

Password Reset; FIG. 4

In this embodiment, the password of the printer 100 is reset by changing it to a new password PW2 instead of by changing it to the initial password PW0. In the present embodiment, the server 200 generates a new password PW2 in T130 following T124. The new password PW2 is, for example, a random character string. T136 is the same as T126, except that the permission signal includes the new password PW2. In T138, the printer 100 changes the current password PW1 to the new password PW2. Further, the printer 100 displays the new password PW2 on the display unit 114. The administrator is thus able to know the new password PW2. In a modification, the new password PW2 may be printed by the print execution unit 116 of the printer 100. In another modification, an e-mail including the new password PW2 in the body may be sent to the terminal 10. In the present embodiment as well, the password of the printer 100 can be changed securely.

Third Embodiment

Password Reset; FIG. 4

In the second embodiment, the new password PW2 is generated by the server 200. In the present embodiment, a new password PW3 is generated by the printer 100.

T146 follows T124 and is the same as T126. In response to receiving the permission signal from the server 200 in T146, the printer 100 generates a new password PW3 in T147. T148 is the same as T138, except that the new password PW3 is used. In T150, the printer 100 sends the new password PW3 to the server 200.

In response to receiving the new password PW3 from the printer 100 in T150, the server 200 sends a password notification e-mail including the e-mail address, which is the logged-in account name AN1, as its recipient in T152. The password notification e-mail includes the new password PW3 in the body. The terminal 10 receives the password notification e-mail from the server 200 in T152 and then displays the password notification e-mail on the display unit 14 in T154. As a result, the administrator is able to know the new password PW3. In a modification, the new password PW3 may be printed by the print execution unit 116 of the printer 100 or may be displayed on the display unit 114 of the printer 100. In the present embodiment as well, the password of the printer 100 can be changed securely.

Fourth Embodiment

Figure 5:
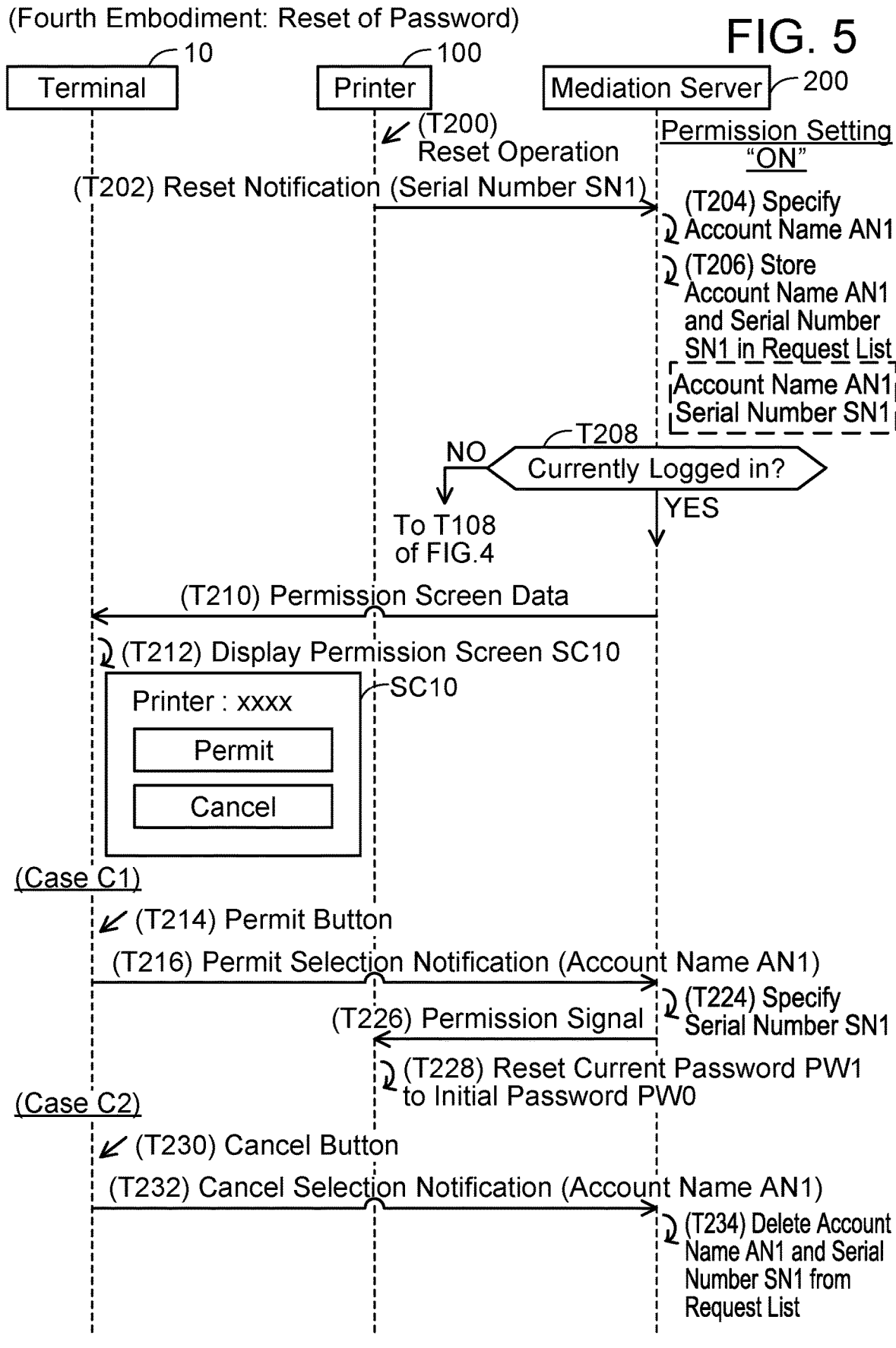
FIG. 5 is a sequence diagram of password reset process.

Password Reset; FIG. 5

The present embodiment can deal with a situation where the terminal 10 is already logged in to the server 200 before the reset operation is performed. T200 to T206 in FIG. 5 are the same as T100 to T106 in FIG. 4. In T208 following T206, the server 200 determines whether the terminal 10 is logged in to the server 200 using the account name AN1 specified in T204. If determining that the terminal 10 is not logged in to the server 200 using the account name AN1 (NO in T208), the server 200 executes the sequence from T108 onward in FIG. 4. That is, a login request e-mail is sent and the terminal 10 then logs in to the server 200.

If determining that the terminal 10 is logged in to the server 200 using the account name AN1 (YES in T208), the server 200 sends permission screen data to the terminal 10 which is logged in to the server 200 using the account name AN1 in T210. The permission screen data corresponds to a permission screen SC10 for asking permission for a password reset to the user of the terminal 10, i.e., the administrator.

In response to receiving the permission screen data from the server 200 in T210, the terminal 10 displays the permission screen SC10 on the display unit 14 in T212. The terminal 10 displays the permission screen SC10 on the display unit 14, for example, by updating the currently displayed screen according to the web browser program to the permission screen SC10. The permission screen SC10 includes a Permit button for input of instruction to permit a password reset and a Cancel button for input of instruction not to permit a password reset.

In Case C1, the administrator selects the Permit button in the permission screen SC10 in T214. In this case, in T216, the terminal 10 sends the server 200 a permission selection notification notifying that the Permit button was selected. The permission selection notification includes the account name AN1. T224 to T228 are the same as T124 to T128 in FIG. 4, except that the account name AN1 included in the permission selection notification is used. That is, in the present case, the server 200 sends the permission signal to the printer 100 if a condition that: the server 200 receives the reset notification from the printer 100 in response to the reset operation; the login using the account name AN1 succeeds; and the Permit button in the permission screen SC10 is selected, is fulfilled. Through the permission screen SC10, it is possible to ask for the administrator's permission for a password reset.

In Case C2, the administrator selects the Cancel button in the permission screen SC10 in T230. In this case, in T232, the terminal 10 sends the server 200 a cancel selection notification notifying that the Cancel button was selected. The cancel selection notification includes the account name AN1.

In response to receiving the cancel selection notification from the terminal 10 in T232, the server 200 deletes the account name AN1 and the serial number SN1 from the request list in T234. As a result, sending of the permission signal is cancelled and thus the password is not reset. For example, even if a third party performs the reset operation, the administrator can cancel this password reset.

Effects of Present Embodiment

If the terminal 10 is not logged in to the server 200 using the account name AN1 (NO in T208), the login request e-mail is sent to the terminal 10. The terminal 10 thus logs in to the server 200. On the other hand, if the terminal 10 is logged in to the server 200 using the account name AN1 (YES in T208), the permission screen data is sent to the terminal 10. The user of the terminal 10, i.e., the administrator, is thus able to know that the reset operation was performed on the printer 100. Then, the administrator can permit the password to be reset by selecting the Permit button in the permission screen SC10.

Correspondence Relationships

The reset operation in T200, the reset notification in T202, and the permission signal in T226 of FIG. 5 are examples of "changing operation", "predetermined signal", and "permission signal", respectively. The permission screen data in T210 is an example of "screen data" and "permission screen data". The permission screen SC10 is an example of "permission screen". The request list is an example of "device information".

Fifth Embodiment

Figure 6:
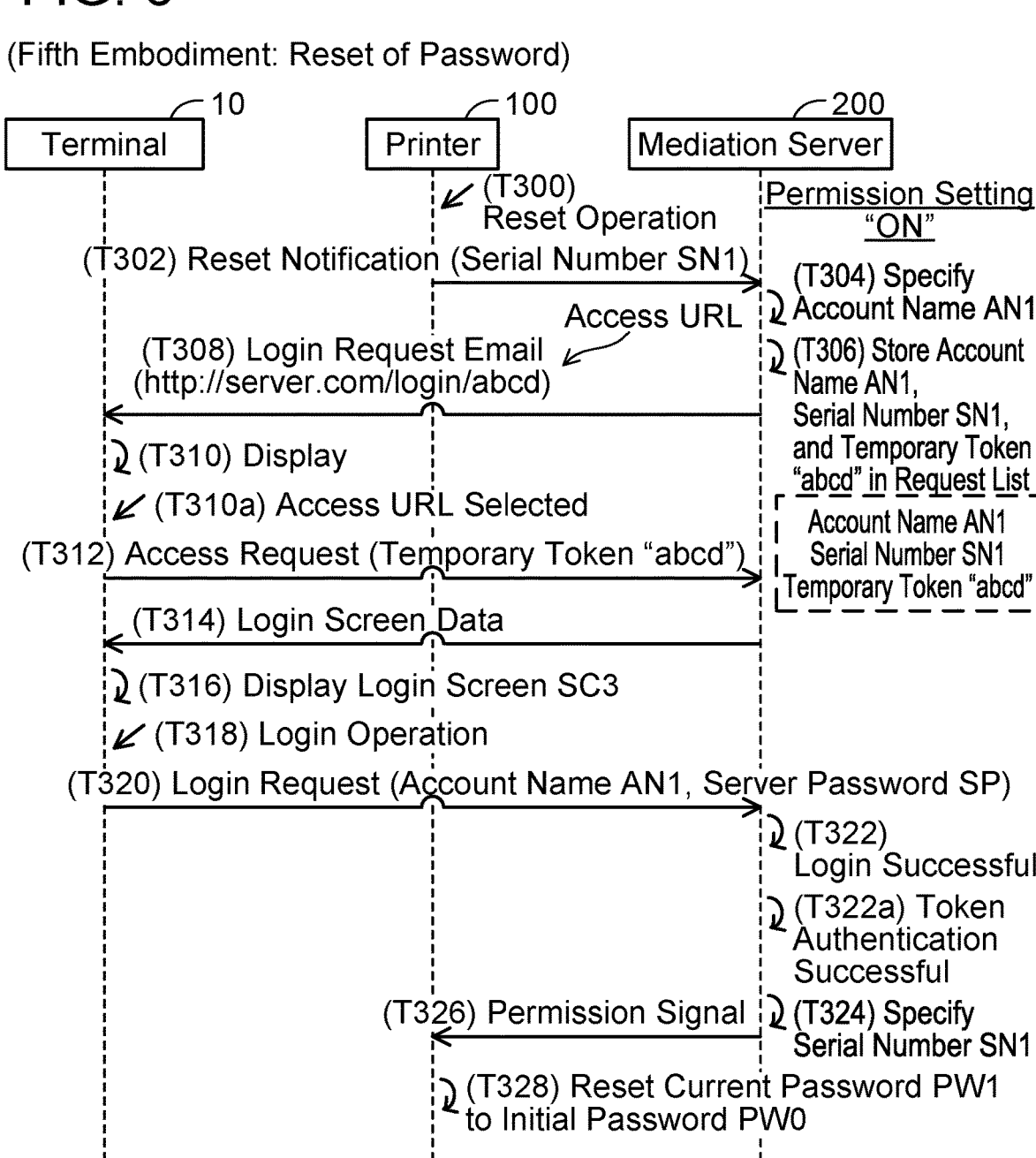
FIG. 6 is a sequence diagram of password reset process.

Password Reset; FIG. 6

The present embodiment is the same as the first embodiment, except that a temporary token is used and the body of the login request e-mail includes an access URL to access to the server 200. T300 to T304 are the same as T100 to T104 in FIG. 4. In T306 following T304, the server 200 generates a temporary token "abcd". The server 200 stores the account name AN1 specified in T304, the serial number SN1 included in the reset notification in T302, and the generated temporary token "abcd" in the request list in the memory 234. The temporary token "abcd" is deleted after a predetermined time period.

T308 is the same as T108 in FIG. 4, except that the body of the login request e-mail includes an access URL. The access URL includes a domain to access the server 200, a directory to access a folder in the server 200, and the temporary token "abcd". This directory indicates the folder in which the login screen data is stored.

T310 is the same as T110 in FIG. 4, except that the access URL is displayed. In T310a, the terminal 10 accepts selection of the access URL from the administrator. T312 is the same as T112 in FIG. 4, except that the access request includes the temporary token "abcd". T314 to T322 are the same as T114 to T122 in FIG. 4. In T322a following T322, the server 200 executes authentication for the temporary token "abcd" included in the access request. In the present case, the access token "abcd" included in the access request matches the temporary token "abcd" stored in the request list in T306, and thus the authentication for the temporary token "abcd" included in the access request succeeds. If the authentication succeeds, the server 200 executes a sequence from T324 onward. T324 to T328 are the same as T124 to T128 in FIG. 4.

The access request does not include the temporary token "abcd", for example, if a terminal device different from the terminal 10 which received the login request e-mail logs in to the server 200. In this case, the authentication for the temporary token fails. If the authentication fails, the sequence from T324 onward is not executed and thus the password is not reset. The authentication using the temporary token prevents the password to be reset by login of a terminal device which is not the recipient of the login request e-mail.

Effects of Present Embodiment

In the present embodiment, the administrator can start the web browser program simply by selecting the access URL included in the login request e-mail. User convenience is improved.

Correspondence Relationships

The reset operation in T300, the reset notification in T302, and the permission signal in T326 are examples of "changing operation", "predetermined signal", and "permission signal", respectively. The access URL is an example of "URL".

Sixth Embodiment

Figure 7:
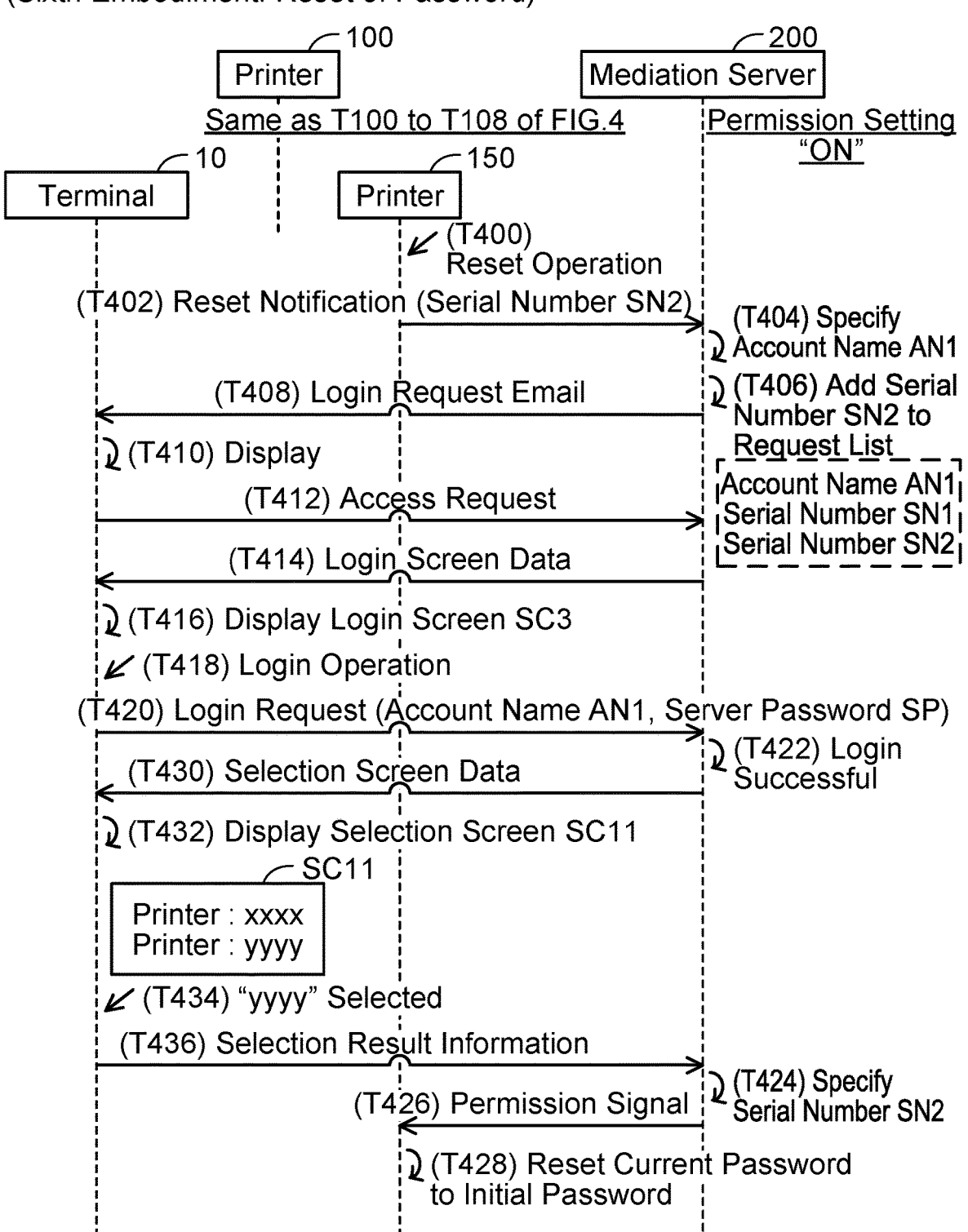
FIG. 7 is a sequence diagram of password reset process.

Password Reset; FIG. 7

In the present embodiment, the reset operation is performed not only on the printer 100 but also on the printer 150. T400 to T404 are the same as T100 to T104 in FIG. 4, except that the printer 150 is operated and that the reset notification includes the serial number SN2 of the printer 150. In the present case, the sequence from T100 to T108 in FIG. 4 has been executed for the printer 100 before T400. Thus, the serial number SN1 of the printer 100 is already stored in the request list. In T406 following T404, the server 200 adds the serial number SN2 received in T402 to the request list.

T408 to T422 are the same as T108 to T122 in FIG. 4. In T430 following T422, the server 200 sends selection screen data to the terminal 10.

In response to receiving the selection screen data from the server 200 in T430, the terminal 10 displays a selection screen SC11 corresponding to the selection screen data on the display unit 14 in T432. The selection screen SC11 is a screen for selecting a specific printer from among a plurality of printers registered in the request list. In the present case, the selection screen SC11 includes a model name "xxxx" of the printer 100 identified by the serial number SN1 in the request list and a model name "yyyy" of the printer 150 identified by the serial number SN2 in the request list. In the present case, the administrator selects the model name "yyyy" in the selection screen SC11.

In response to accepting the selection of model name "yyyy" in the selection screen SC11 in T434, the terminal 10 sends the server 200 selection result information indicating that the model name "yyyy" was selected in T436.

In response to receiving the selection result information from the terminal 10 in T436, the server 200 specifies the serial number SN2 in the request list which is associated with the model name "yyyy" indicated by the selection result information in T424.

In T426, the server 200 sends a permission signal to the printer 150 which is identified by the serial number SN2 specified in T424. T428 is the same as T128 in FIG. 4, except that the password of the printer 150 is reset.

The technology of the present embodiment can be applied to not only the case where the reset operation is performed on the two printers 100 and 150 but also to cases where the reset operation is performed on three or more printers. In the present embodiment, the administrator can select a printer whose password is to be reset in the situation where the reset operation is performed on a plurality of printers. The administrator may select two or more printers in the selection screen SC11 instead of selecting only one printer. In this case, the passwords of these two or more printers can be reset all together.

Correspondence Relationships

The reset operation in T400, the reset notification in T402, and the permission signal in T426 of FIG. 7 are examples of "changing operation", "predetermined signal", and "permission signal", respectively. The printers 100 and 150 are an example of "two or more devices".

Seventh Embodiment

Figure 8:
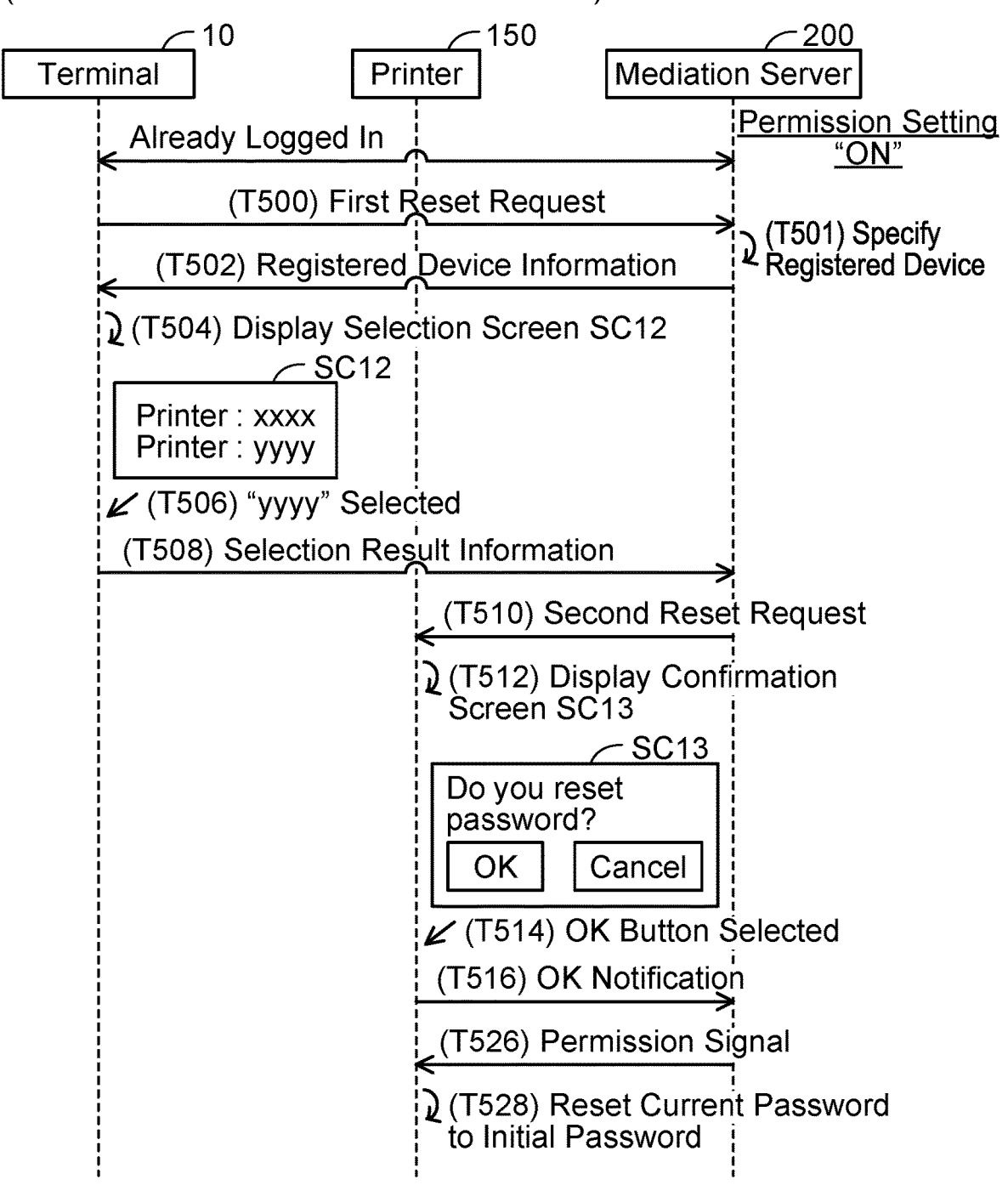
FIG. 8 is a sequence diagram of password reset process.

Password Reset; FIG. 8

In the present embodiment, a request from the terminal 10 triggers a password reset. In the initial state of FIG. 8, the terminal 10 is already logged in to the server 200 using the account name AN1. In T500, in response to a predetermined operation being performed by the administrator, the terminal 10 sends a first reset request to the server 200. The first reset request requests a reset of the password of a printer registered in the server 200.

In response to receiving the first reset request from the terminal 10 in T500, the server 200 specifies one or more registered devices in the device table 244 in T501. A registered device means a printer identified by the serial number associated with the logged-in account name AN1.

In T502, the server 200 sends the terminal device 10 registered device information indicating the one or more registered devices specified in T501.

In response to receiving the registered device information from the server 200 in T502, the terminal 10 displays on the display unit 14 a selection screen SC12 for selecting a specific registered device from among the one or more registered devices indicated by the registered device information in T504. In the present case, the selection screen SC12 is the same as the selection screen SC11 shown in FIG. 7.

In response to accepting selection of the model name "yyyy" in the selection screen SC12 in T506, the terminal 10 sends the server 200 selection result information indicating that the model name "yyyy" was selected in T508.

In response to receiving the selection result information from the terminal 10 in T508, the server 200 sends a second reset request to the printer 150 indicated by the selection result information in T510. The second reset request requests a reset of the password of the printer 150.

In response to receiving the second reset request from the server 200 in T510, the printer 150 displays a confirmation screen SC13 in T512. The confirmation screen SC13 is a screen for checking with the administrator whether the password is to be reset. The confirmation screen SC13 includes an OK button and a Cancel button.

In the present case, the administrator permits the password of the printer 150 to be reset. Thus, in T514, the administrator selects the OK button in the confirmation screen SC13.

In response to accepting the selection of OK button in the confirmation screen SC13 in T514, the printer 150 sends the server 200 an OK notification notifying that the OK button was selected in T516.

In response to receiving the OK notification from the printer 150 in T516, the server 200 executes T526. T526 and T528 are the same as T426 and T428 in FIG. 7.

According to the configuration of the present embodiment, the server 200 sends the permission signal to the printer 150 if a condition that: the server 200 receives the first reset request from the terminal 10 which is logged in to the server 200 using the account name AN1; and the server 200 receives the OK notification from the printer 150 in response to the selection of the OK button (T500 and T516), is fulfilled. Receiving the first reset request from the terminal 10 which is logged in to the server 200 using the account name AN1 means that the terminal 10 has successfully logged in using the account name AN1. In the present embodiment, as with the first embodiment, the password of the printer 150 is reset if the condition that a signal received from the printer 150 in response to the operation being performed on the printer 150 and the login using the account name AN1 (T500 and T516) was successful is fulfilled. Thus, the password of the printer 150 can be changed securely as with the first embodiment.

Correspondence Relationships

The selection of the OK button in T514, the OK notification in T516, and the permission signal in T526 of FIG. 8 are examples of "changing operation", "predetermined signal", and "permission signal", respectively. The first reset request in T500 and the second reset request in T510 are examples of "first request" and "second request", respectively.

Modification of Seventh Embodiment

In the present modification, T510 is omitted. In this case, for example, after T508, the terminal 10 displays a specific screen that prompts the administrator to perform a specific operation on the printer 150 which is indicated by the model name "yyyy" selected in T506. The specific operation is an operation for causing the printer 150 to display the confirmation screen SC13. The administrator sees the specific screen and then performs the specific operation on the printer 150. As a result, the sequence from T512 onward is executed. In the present modification as well, the password of the printer 150 can be changed securely.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modification 1

The "device" is not limited to the printer 100 and may be, for example, a scanner, a FAX machine, a PC, or the like.

Modification 2

The "identification information" is not limited to the serial number SN1 and may be, for example, a MAC address of the printer 100 or the like.

Modification 3

For example, a short message service (SMS) message, a social networking service (SNS) message, or the like may be sent instead of the login request e-mail in T108 of FIG. 4. In this modification, the SMS message or the SNS message is an example of "message".

Modification 4

For example, a screen that does not include a Permit button and includes a message indicating that the password is to be reset may be displayed instead of the permission screen SC10 in T212 of FIG. 5. In this modification, screen data corresponding to the above screen is an example of "screen data".

Modification 5

In the fifth embodiment shown in FIG. 6, the access URL may not include the temporary token. In this modification, an access URL that does not include a temporary token is an example of "URL".

Modification 6

The application of the permission screen SC10 in the fourth embodiment is not limited to the fourth embodiment, and the permission screen SC10 is applicable to the other embodiments. For example, if the permission screen SC10 is applied to the first embodiment, the terminal 10 may display the permission screen SC10 after successfully logging in to the server 200.

Modification 7

The login request e-mail in the fifth embodiment may be an HTML e-mail. In this case, a screen on which the login request e-mail is displayed may include a Permit button and a Cancel button. The Permit button may be associated with the access URL. The Cancel button may be associated with a URL attached with information indicating that the password reset is not permitted. In this modification, the screen on which the login request e-mail is displayed is an example of "permission screen".

Modification 8

In the registration of the printer 100 show in FIGS. 2 and 3, a terminal device different from the terminal 10 may be used. The other terminal device is an example of "external device".

Modification 9

The method for registering the printer 100 shown in FIGS. 2 and 3 is merely an example, and for example, the PIN code is not necessarily used. In this modification, the "specific information" may be omitted.

Modification 10

The server 200 does not necessarily store the permission setting 250. In this modification, "setting value" may be omitted.

Modification 11

In the embodiments described above, the processes of FIGS. 2 to 8 are realized by the CPUs executing the programs. Instead of this, at least one of these processes may be realized by hardware such as a logic circuit, etc.

What is claimed is:

1. A server comprising:
a memory configured to store account information and identification information identifying a device, the account information and the identification information being in association with each other; and
a controller,
wherein the controller is configured to:
in a case where a changing operation is performed on the device, receive a predetermined signal from the device, the changing operation being for changing a password currently set for the device; and
in a case where a specific condition is fulfilled, send the device a permission signal for permitting a change of the password, wherein the specific condition is that the predetermined signal is received from the device and login authentication executed by the server is successful, wherein the login authentication is a process for a terminal device different from the device to log in to the server by using the account information stored in association with the identification information identifying the device.

2. The server according to claim 1, wherein the controller is further configured to, in a case where the predetermined signal is received from the device, send the terminal device a message that prompts login to the server.

3. The server according to claim 2, wherein the controller sends the terminal device the message in a case where the predetermined signal is received from the device under a situation where the terminal device is not logged in to the server by using the account information, and the controller is further configured to, in a case where the predetermined signal is received from the device under a situation where the terminal device is logged in to the server by using the account information, send the terminal device screen data that corresponds to a screen indicating that the changing operation has been performed on the device.

4. The server according to claim 2, wherein the message includes a Uniform Resource Locator (URL) for displaying a login screen for login to the server.

5. The server according to claim 1, wherein the specific condition is fulfilled by receiving the predetermined signal from the device under a situation where the terminal device is logged in to the server by using the account information.

6. The server according to claim 1, wherein the controller receives the predetermined signal from each of two or more devices including the device, the controller is further configured to, in a case where the predetermined signal is received from each of the two or more devices, send selection screen data to the terminal device, the selection screen data corresponding to a selection screen for selecting a specific device from among the two or more devices, and the controller sends the permission signal to the specific device selected on the selection screen.

7. The server according to claim 1, wherein the controller is further configured to, in a case where the predetermined signal is received from the device, send permission screen data to the terminal device, the specific condition is that the predetermined signal is received from the device, the terminal device is logged in to the server by using the account information, and an instruction to permit a change of the password is inputted on a permission screen corresponding to the permission screen data, and the specific condition is not fulfilled in a case where an instruction not to permit a change of the password is inputted on the permission screen.

8. The server according to claim 1, wherein the permission signal is a signal that permits a reset of the password currently set for the device to an initial password.

9. The server according to claim 1, wherein the controller is further configured to:

receive a registration request from an external device, the registration request including specific information for specifying the account information and the identification information; and in a case where the registration request is received from the external device, store the identification information in association with the account information specified by the specific information.

10. The server according to claim 1, wherein the memory is further configured to store a setting value that indicates either one of a first value for permitting a change of the password using the permission signal and a second value for not permitting a change of the password using the permission signal.

11. The server according to claim 1, wherein the account information includes a server password different from the password set for the device, and in the login authentication, the server password in the account information is used.

12. A non-transitory computer-readable recording medium storing computer-readable instructions for a server, wherein the server comprises:

a memory configured to store account information and identification information identifying a device, the account information and the identification information being in association with each other; and a processor, wherein the computer-readable instructions, when the processor, cause the server to:

in a case where a changing operation is performed on the device, receive a predetermined signal from the device, the changing operation being for changing a password currently set for the device; and in a case where a specific condition is fulfilled, send the device a permission signal for permitting a change of the password, wherein the specific condition is that the predetermined signal is received from the device and login authentication executed by the server is successful, wherein the login authentication is a process for a terminal device different from the device to log in to the server by using the account information stored in association with the identification information identifying the device.

13. A control method for a server, wherein the server comprises a memory configured to store account information and identification information identifying a device, the account information and the identification information being in association with each other, wherein the control method comprises:

in a case where a changing operation is performed on the device, receiving a predetermined signal from the device, the changing operation being for changing a password currently set for the device; and in a case where a specific condition is fulfilled, sending the device a permission signal for permitting a change of the password, wherein the specific condition is that the predetermined signal is received from the device and login authentication executed by the server is successful, wherein the login authentication is a process for a terminal device different from the device to log in to the server by using the account information stored in association with the identification information identifying the device.

14. A server comprising:

a memory configured to store account information and identification information identifying a device, the account information and the identification information being in association with each other; and a controller, wherein the controller is configured to:

under the situation where a terminal device different from the device is logged in to the server by using the account information stored in association with the identification information identifying the device, receive a first request that requests a change of a password from the terminal device;

in a case where the first request is received from the terminal device, send the device a second request that requests a changing operation to be performed, wherein the changing operation is for changing a password currently set for the device and the device displays a screen that prompts the changing operation according to the second request;

in a case where the changing operation is performed on the device, receive a predetermined signal from the device; and in a case where a specific condition is fulfilled, send the device a permission signal for permitting a change of the password, wherein the specific condition is that the predetermined signal is received from the device under a situation where the terminal device is logged in to the server by using the account information stored in association with the identification information identifying the device.

15. A server comprising:

a memory configured to store account information and identification information identifying a device, the account information and the identification information being in association with each other; and a controller, wherein the controller is configured to:

in a case where a changing operation is performed on the device, receive a predetermined signal from the device, the changing operation being for changing a password currently set for the device;

in a case where the predetermined signal is received from the device, send permission screen data to the terminal device;

in the case where the predetermined signal is received from the device, store device information that indicates the device for which the password is to be changed in the memory;

in a case where a specific condition is fulfilled, send the device a permission signal for permitting a change of the password, wherein the specific condition is that the predetermined signal is received from the device, a terminal device different from the device is logged in to the server by using the account information stored in association with the identification information identifying the device, and an instruction to permit a change of the password is inputted on a permission screen corresponding to the permission screen data, wherein the specific condition is not fulfilled in a case where an instruction not to permit a change of the password is inputted on the permission screen; and in the case where the instruction not to permit a change of the password is inputted on the permission screen, delete the device information from the memory.

* * * * *